UNITED STATES PATENT OFFICE 2,671,067

DIMETHYLENE GLYCOLAMIDES AS SOLVENTS FOR ACRYLONITRILE POLYMERS

Robert Lowry Brown, West Chester, Pa., assignor to E. I. du Pont de Nemours and Company, Wilmington, Del., a corporation of Delaware No Drawing. Application November 26, 1951, Serial No. 258,289

13 Claims. (Cl. 260—32.6)

This invention relates to new compositions of matter. More particularly, this invention relates to compositions of matter involving acrylonitrile polymers.

In the commercialization of acrylonitrile polymers the provision of solvents and plasticizers has been and continues to be a key problem. The acrylonitrile polymers containing at least 85% acrylonitrile are notoriously difficult to dissolve. Techniques involved in shaping articles from these polymers, such as films and fibers, depend upon the production of solutions or plasticized compositions, for the polymers are not meltable of themselves. While certain solvents and plasticizers are now known for these polymers, the search for new, effective materials continues because commercialization demands flexibility, better and cheaper solvents and plasticizers, and improved properties in the shaped articles.

It is therefore an object of this invention to provide new compositions of matter which can be used for shaping acrylonitrile polymer articles. A further object is the provision of solutions of acrylonitrile polymers. A still further object is the provision of new compositions of matter of acrylonitrile polymers containing at least 85% acrylonitrile. Further objects will appear hereinafter.

These objects are accomplished by the provision of mixtures of acrylonitrile polymers with dimethylene glycolamide compounds. These mixtures may be solutions or plasticized compositions depending upon the amount of dimethylene glycolamide used relative to the amount of polymer present. The dimethylene glycolamide compounds of this invention are embraced by the following formula:

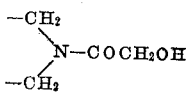

where $x$ and $y$ are integers, $y$ being at least 1; $x$ being of such value that the ratio $x/y$ does not exceed 1.0 except that when the amide nitrogen is a part of a saturated ring, the ratio of $x/y$ does not exceed 2.0, all valences of said compound other than those contained in carbon-to-carbon linkages and not shown as satisfied in the formula being satisfied by a substituent taken from the group consisting of hydrogen, halogen, oxygen, bivalent sulfur, hydroxyl, thiol, cyano, thiocyano, and sulfoxy; the total number of said halogen, oxygen, sulfur, hydroxy and thiol substituents not exceeding the value of $y$ and the total number of cyano, thiocyano and sulfoxy groups not exceeding twice the value of $y$. In the formula, $x$ may be zero and in that event, the valence bonds of the methylene groups may be satisfied by another $y$ radical or by hydrogen, halogen, hydroxyl, thiol, cyano, or thiocyano radicals, the total number of said halogen, hydroxyl and thiol radicals not exceeding the value of $y$, i. e. the number of

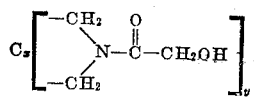

groups in the compound, and the total number of cyano and thiocyano radicals not exceeding twice the value of $y$. The presence of additional solvogenic groups, such as those listed above, generally improves the solubility. The invention may be further understood by reference to the following examples and description.

Example I

One part of a copolymer of acrylonitrile with 2-vinylpyridine (95/5) and 10 parts of N,N-dimethylglycolamide were heated in a container at 100° C. The resultant solution was useful for casting films or forming fibers by the usual wet or dry spinning techniques.

Example II

Three cubic centimeters of N-methyl-N-ethylglycolamide and 0.2 gram of acrylonitrile/2-vinylpyridine (95/5) were heated with stirring. Solution was complete at 150° C. Similarly, acrylonitrile/2-methyl-5-vinylpyridine (95/5) copolymer dissolved. No gel particles could be detected in either solution. The solutions of these copolymers did not gel immediately upon cooling to room temperature.

Polyacrylonitrile was readily dissolved in this solvent at a temperature of 200–210° C. This solution gelled on cooling.

Example III

A mixture of 1.5 parts of polyacrylonitrile and 8.5 parts of N,N-dimethylglycolamide was slurried easily at 60° C. Upon heating to 140° C., a smooth, semi-viscous solution resulted. This was cast into a film. After removing the solvent by washing with water, a film was obtained.

In similar fashion polyacrylonitrile or acrylonitrile copolymers dissolved in the following solvents.

| Structure | Name |
|---|---|
| HOCH$_2$C(O)−N(CH$_2$CH$_2$)(CH$_2$CH$_2$)N−C(O)CH$_2$OH (piperazine ring) | N,N'-di(hydroxyacetyl) piperazine |
| HOCH$_2$C(O)−N(CH$_3$)−CH$_2$CH$_2$−N(CH$_3$)−C(O)CH$_2$OH | N,N'-dimethyl ethylene-bisglycolamide. |
| HOCH$_2$C(O)−N(C$_2$H$_5$)−CH$_2$CH$_2$−N(CH$_3$)−C(O)−CH$_2$OH | N-methyl-N'-ethyl ethylene bisglycolamide. |
| HOCH$_2$C(O)−N(CH$_3$)−CH$_2$CH$_2$CH$_2$−N(CH$_3$)−C(O)−CH$_2$OH | N,N'-dimethyl trimethylene bisglycolamide. |
| HOCH$_2$C(O)−N(CH$_2$CH$_2$)(CH$_2$CH$_2$) (pyrrolidine) | N-hydroxyacetyl pyrrolidine. |
| HOCH−C(O)−N(CH$_2$CH$_2$)(CH$_2$CH$_2$)O (morpholine) | N-hydroxyacetyl morpholine. |
| HOCH$_2$C(O)−N(C$_2$H$_5$)−CH$_2$−CH$_2$−N(C$_2$H$_5$)−C(O)−CH$_2$OH | N,N'-diethyl ethylene bisglycolamide. |
| HOCH$_2$C(O)−N(C$_2$H$_5$)−CH$_2$CH$_2$CH$_2$−N(CH$_3$)−C(O)−CH$_2$OH | N-methyl-N-ethyl trimethylenebisglycolamide. |
| HOCH$_2$C(O)−N(CH$_3$)−CH$_2$CH$_2$CH$_2$CH$_2$−N(CH$_3$)−C(O)−CH$_2$OH | N,N'-dimethyl tetramethylene bisglycolamide. |
| NC−CH$_2$N(CH$_3$)−C(O)−CH$_2$OH | N-methyl-N-cyanomethyl glycolamide. |
| NCCH$_2$−N(CH$_2$CN)−C(O)−CH$_2$OH | N,N-bis(cyanomethyl) glycolamide. |
| NCSCH$_2$−N(CH$_2$CN)−C(O)−CH$_2$OH | N-cyanomethyl-N-thiocyanomethyl glycolamide. |
| NCSCH$_2$CH$_2$−N(CH$_3$)−C(O)−CH$_2$OH | N-methyl-N-(β-thiocyanoethyl) glycolamide. |
| HOCH$_2$C(O)−N(CH$_2$CH$_2$CN)−CH$_2$CH$_2$−N(CH$_2$CH$_2$CN)−C(O)−CH$_2$OH | N-N'-di(β-cyanoethyl) ethylene bisglycolamide. |
| CH$_3$CH$_2$N(C(O)CH$_2$OH)−CH$_2$CH$_2$N(C(O)CH$_2$OH)−CH$_2$CH$_2$N(C(O)CH$_2$OH)−CH$_2$CH$_3$ | 3,6,9-trishydroxyacetyl-3,6,9-triazaundecane. |
| CH$_3$OCH$_2$−N(CH$_3$)−C(O)−CH$_2$OH | N-methyl-N-methoxymethyl glycolamide. |
| HOCH$_2$CH$_2$−N(CH$_3$)−C(O)−CH$_2$OH | N-methyl-N-(β-hydroxyethyl) glycolamide. |
| ClCH$_2$CH$_2$−N(CH$_3$)−C(O)−CH$_2$OH | N-methyl-N-(β-chloroethyl) glycolamide. |

| Structure | Name |
|---|---|
| HSCH$_2$CH$_2$—N(CH$_3$)—C(=O)—CH$_2$OH | N-methyl-N-(β-thiolethyl) glycolamide. |
| HOCH$_2$—C(=O)—N(CH$_2$CH$_2$)(CH$_2$CH$_2$)S (thiomorpholine ring) | N-hydroxyacetyl thiomorpholine. |
| HOCH$_2$—C(=O)—N(CH$_2$CH$_2$)(CH$_2$CH$_2$)SO$_2$ | N-hydroxyacetyl-1,4-thiazane-1,1-dioxide. |
| HOCH$_2$C(=O)—N(CH$_2$CH$_2$)(CH$_2$CH$_2$)S=O | N-hydroxyacetyl-1,4-thiazane-1-oxide. |
| HOCH$_2$C(=O)—N(CH$_3$)—CH$_2$CH$_2$OCH$_2$CH$_2$—N(CH$_3$)—C(=O)—CH$_2$OH | bis [β-(N-methyl-N-hydroxyacetyl) aminoethyl] ether. |
| HOCH$_2$C(=O)—N(CH$_3$)—CH$_2$CH$_2$S(O$_2$)—CH$_2$CH$_2$N(CH$_3$)—C(=O)—CH$_2$OH | bis [β-(N-methyl-N-hydroxyacetyl) aminoethyl] sulfone. |
| HOCH$_2$C(=O)—N(CH$_3$)—CH$_2$CH=CHCH$_2$—N(CH$_3$)—C(=O)—CH$_2$OH | N,N'-dimethyl-N,N'-di(hydroxyacetyl)1,4-di-aminobutene-2. |

The polymers and copolymers of acrylonitrile for use in this invention can be prepared in any suitable manner such as those methods disclosed in U. S. Patent 2,160,054 or in U. S. Patents 2,404,714—2,404,727. The invention comprehends dissolving of acrylonitrile homopolymers and copolymers and interpolymers in which acrylonitrile is polymerized with other polymerizable substances such as, for example, compounds containing 1 or more ethylenic linkages which, in addition to those mentioned above in the examples or in the reference patents may include vinyl acetate, vinyl chloride, isobutylene and butadiene. The solvents of this invention are eminently satisfactory for use with those polymers which contain a large amount of acrylonitrile, fore example, polymers that contain in the polymer molecule at least 85% by weight of acrylonitrile. If the polymer does not contain all acrylonitrile, the remaining portion of the copolymer is, of course, derived from a monomer copolymerizable with acrylonitrile. The invention, of course, applies to polymers containing less than 85% acrylonitrile, as for example, 50% or 80% acrylonitrile, since such copolymers are more soluble than those containing 85% or more acrylonitrile. It is preferred to use the latter polymers commercially since shaped articles therefrom have much better properties than those from the polymers containing lower amounts of acrylonitrile. The solvent may be used in forming useful compositions with polymers having an average molecule weight between 10,000 and 250,000 as determined by viscosity data using the Staudinger equation. Such polymers are generally used in the manufacture of yarns and filaments. Usually, polymers having a molecular weight between 40,000 and 150,000 are preferred.

The above described solutions of the acrylonitrile polymers may be shaped in the form of filaments, yarns, films, tubes and like structures by apparatus and processes generally known in the art, the detailed operating conditions being suitably modified. The solutions are stable at room temperature and at elevated temperatures and may be used in producing shaped articles by extruding these solutions into an evaporative or coagulating medium. Film formation is readily achieved by casting the solution onto a smooth surface such as an endless steel band under the smoothing action of a doctor knife. The solvent may be removed either by the dry or evaporative method or by the wet method which utilizes a liquid coagulating bath. Similarly, the solutions may be used in the manufacture of moulded articles or as lacquer or coating compositions, these being especially useful in the coating of wire and electrical parts where high chemical and electrical resistance is important. In the preparation of shaped articles involving the use of solutions, solutions having viscosities of from about 25 to 750 poises are preferred.

In addition to acting as solvents, the solvents of this invention can also be used as a plasticizing agent when present in small amounts. Non-solvent softeners such as glycerol may also be incorporated.

In preparing the compositions of this invention very small amounts of the dimethylene glycolamide may be used, as, for example, 40% to 65% to produce compositions suitable for melt spinning. Smaller amounts, such as 5% to 40% or more, may be employed to produce compositions useful in obtaining moulded articles. In producing solutions for dry spinning or wet spinning the amount of the dimethylene glycolamide ranges preferably from 75% to 90%. Greater amounts may be used if desired. The compositions of this invention are cohesible mixtures and are adapted for making formed articles. In shaping, heat, pressure or heat and pressure may be used to make the compositions cohesive.

The provision of these novel solvents is highly advantageous in that very fine slurries of the polymer at room temperature are obtained. This eliminates the necessity for heat treating the polymer to harden it in order to get improved slurrying so that rapid solution is possible. The stability of these solvents is greater than possessed by most solvents in all regards, especially in regard to color formation brought about by metal salts or by the development of impurities in the solvent at elevated temperatures. There is very little adverse color formation and degradation of the polymer in solutions of this invention. The possibilities for the commercialization of acrylonitrile polymers containing at least 85% acrylonitrile are decidedly enhanced by this invention.

The compositions of this invention may be used to produce the following:

Outdoor uses

Auto tops
Balloon fabric
Belts for combines
Fire hose covers
Horse harness
Harvester aprons
Lawn mower baskets
Life belts and preservers
Mosquito netting
Rainwear
Outdoor sewing thread
Sporting equipment
Hammocks
Sea bags

Flat fabrics

Crepe fabrics
Airplane head rest
Diaphragms
Lamination
Leader cloths
RR canvas
Shower curtains
Tracing cloth
Varnished thread
Varnished silk
Curtains
Shades
Ventubes (mining)
Lampshades
Bookbinding
Cloth top sport shoes
Camera bellows
Sacking
Tapestry
Mattress covers

Staple

Blankets
Paper makers' felt
"Felt base" linoleum

Miscellaneous

Laundry net
Braided thread
Cable braid
Tablecloths

Tapes

Zipper
Electrical
Venetian blind tapes
Watch straps

Rubber covered

Coated diaphragms
Conveyor belt

Any departure from the description herein which conforms to the principles of the invention is intended to be included within the scope of the claims below.

I claim:

1. A new composition of matter comprising a mixture of an acrylonitrile polymer containing at least 85% acrylonitrile and a dimethylene glycolamide having the following structure

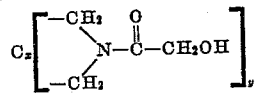

wherein $x$ and $y$ are integers, $y$ being at least 1; $x$ is of such value that the ratio $x/y$ does not exceed 1.0 except that when the amide nitrogen is a part of a ring, the ratio of $x/y$ does not exceed 2.0; and all unsatisfied valences in said structure when not satisfied by carbon-to-carbon linkages being satisfied by a substituent taken from the group consisting of hydrogen, halogen, oxygen, bivalent sulfur, hydroxyl, thiol, cyano, thiocyano and sulfoxy, the total number of said halogen, oxygen, sulfur, hydroxy and thiol substituents not exceeding the value of $y$ and the total number of cyano, thiocyano and sulfoxy substituents not exceeding twice the value of $y$.

2. A composition of matter in accordance with claim 1 wherein said composition is a solution.

3. A composition of matter in accordance with claim 1 wherein said glycolamide is N,N-dimethylglycolamide.

4. A composition of matter in accordance with claim 1 wherein said glycolamide is N-methyl-N-ethylglycolamide.

5. A composition of matter in accordance with claim 1 wherein said polymer is polyacrylonitrile.

6. A composition of matter in accordance with claim 1 wherein said polymer is an acrylonitrile/vinyl pyridine copolymer.

7. A composition of matter in accordance with claim 1 wherein said polymer is a copolymer of acrylonitrile and 2-vinylpyridine.

8. A composition of matter in accordance with claim 1 wherein said polymer has a molecular weight of between 10,000 and 250,000.

9. A composition of matter in accordance with claim 1 wherein said polymer has a molecular weight of between 40,000 and 150,000.

10. A composition of matter in accordance with claim 1 wherein said composition is a solution having a viscosity within the range of 25 to 750 poises.

11. A composition of matter in accordance with claim 1 wherein about 75% to about 90%, by weight of said composition, is said dimethylene glycolamide.

12. A composition of matter in accordance with claim 5 wherein about 75% to about 90%, by weight of said composition, is said dimethyl glycolamide.

13. A composition of matter in accordance with claim 1 wherein said polymer is polyacrylonitrile and said amide is N,N-dimethylglycolamide.

ROBERT LOWRY BROWN.

References Cited in the file of this patent

UNITED STATES PATENTS

| Number | Name | Date |
| --- | --- | --- |
| 2,460,578 | Houtz | Feb. 1, 1949 |
| 2,580,393 | Beaman | Jan. 1, 1952 |
| 2,585,242 | Hagemeyer et al. | Feb. 12, 1952 |